United States Patent [19]
Meenan, Jr.

[11] Patent Number: 6,128,880
[45] Date of Patent: Oct. 10, 2000

[54] REMOVABLE MODULAR DECKING SYSTEM

[76] Inventor: Bernard J. Meenan, Jr., 403 S. 6th St., Wilmington, N.C. 28401

[21] Appl. No.: 09/388,863

[22] Filed: Sep. 2, 1999

[51] Int. Cl.⁷ ...................................................... E04B 2/30
[52] U.S. Cl. ........................ 52/489.1; 52/650.3; 52/263; 52/474; 72/16; 403/231; 403/256; 403/245; 403/373
[58] Field of Search ............................... 52/650.3, 489.1, 52/263

[56] References Cited

U.S. PATENT DOCUMENTS

| | | | |
|---|---|---|---|
| 2,070,479 | 2/1937 | Foster | 52/489.1 |
| 5,049,700 | 9/1991 | kobayashi et al. | 52/263 |
| 5,647,184 | 7/1997 | Davis | 52/592.1 |

Primary Examiner—Carl D. Friedman
Assistant Examiner—Christy M. Syres
Attorney, Agent, or Firm—Rhodes & Mason, PLLC

[57] ABSTRACT

A modular decking system particularly adapted for use with docks in tidal coastal environments is presented. The system provides removable modular decking sections that allow the user to remove the decking prior to a large storm, preventing destruction of the dock by the hydraulic forces of violently rising water. Alternatively, the system may be used in a residential or commercial situation allowing the user to install decking over an area that typically requires access, such as over a flat roof or over areas containing buried services such as cables or piping. The system comprises a number of decking sections that are used with a conventional joist system. Each section includes a plurality of planks that are joined together in parallel to rails that hold the planks together during transportation, installation and removal of the decking sections. A joist cap is provided over each supporting joist, and clamping mechanisms are provided to secure the decking sections to the joist system.

17 Claims, 3 Drawing Sheets

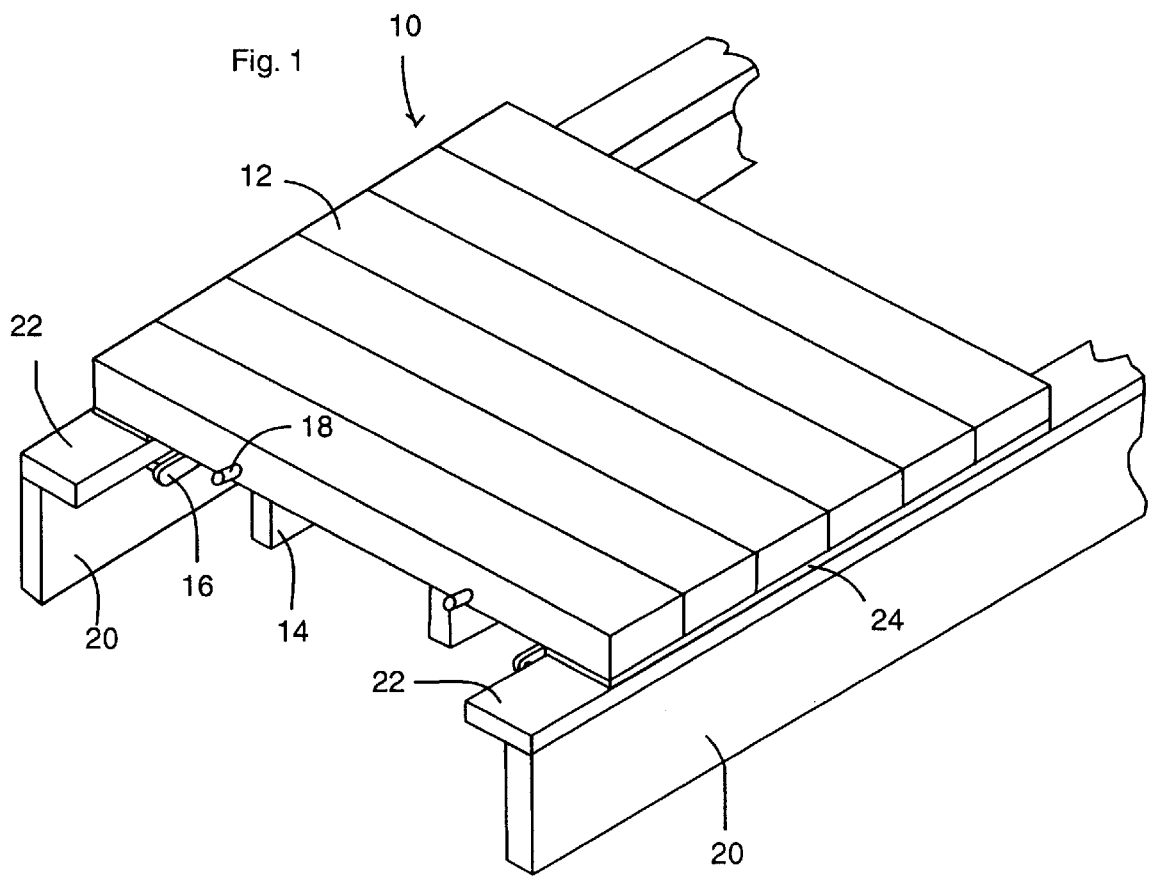
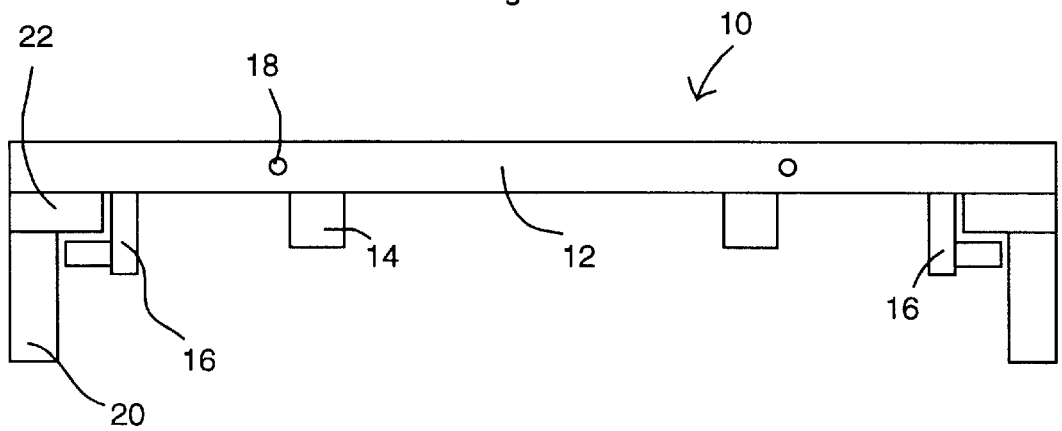

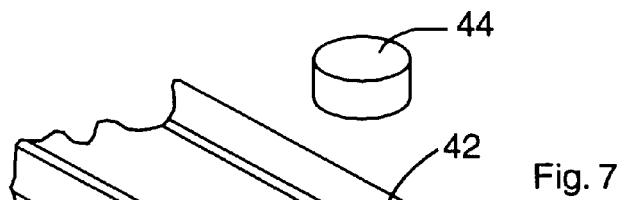
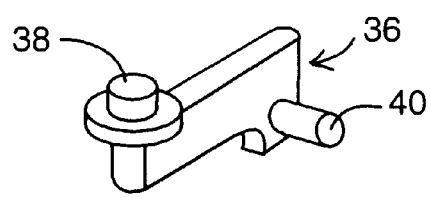
Fig. 7
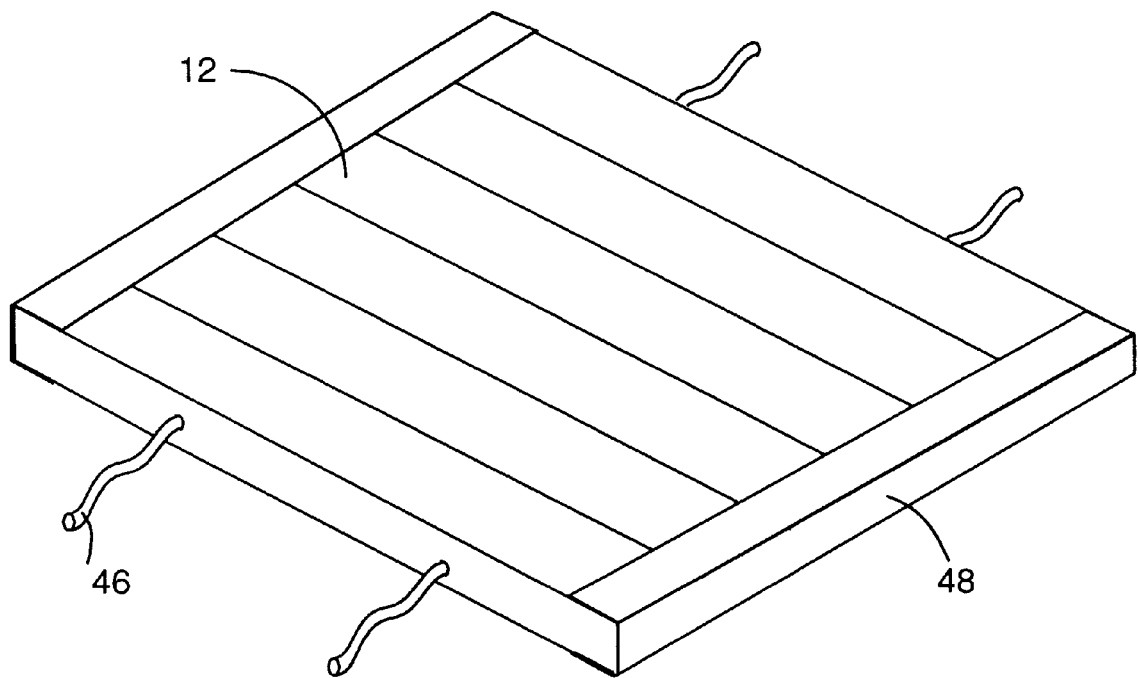
Fig. 8

REMOVABLE MODULAR DECKING SYSTEM

BACKGROUND OF THE INVENTION (1) Field of the Invention

This invention relates generally to decking, and more specifically to such decking that is readily removable by an owner in a non-destructive manner so that it can be easily reinstalled.

(2) Description of the Prior Art

The most common type of decking in use today is that which is constructed of wood, secured with metal fasteners, and assembled using individual planks. However, this method of construction has a number of drawbacks, especially when the decking is used for a fixed marine dock. First, it is well known that wood will warp, splinter, rot, mildew, discolor, and crack as it weathers. Second, wood stains easily, due to its porous, cellular structure. It is also difficult to remove oil or grease from a wooden deck. Third, metal fasteners and wooden planks tend to loosen as wooden decks expand, contract, and otherwise move, whether from thermal cycling, wind, water motion, or manpower. Maintenance is required to ensure that all fasteners and planks remain level with the walking surface so as to maintain a safe deck.

Fourth, standard wooden decking is a relatively fixed surface, removable only in a more-or-less destructive fashion. There is often a desire to construct a deck over an area that needs periodic access (such as a rubber membrane flat roof); a standard wooden deck does not accommodate this situation well. Finally, the decking attached to a fixed marine dock, particularly in coastal areas, can be a hazard to the dock itself. During large storms, water and waves rise significantly, generating hydraulic forces that act on the surface area of the wood. These forces act to destroy the dock either by pulling its pilings from the soil or by violently ripping individual planks and/or joists from the structure.

Others have addressed the issues relating to the problems inherent in wood-based decking systems. U.S. Pat. No. 5,070,664 to Groh et al. (1991) discloses a thermoplastic cover that can be used to protect wood planks. However, this would add additional cost and labor to an installation, and it may actually act to trap moisture in coastal environments. U.S. Pat. No. 5,613,339 to Pollock et al. (1997) discloses a deck plank and cover in which a non-wood plank member is secured to a joist system and a non-wood cover is attached. The deck plank and cover of Pollock has drawbacks, notably that it is not a modular system and that its fixed nature will not accommodate normal expansion, contraction, and other movement. U.S. Pat. No. 5,647,184 to Davis et al. (1997) discloses a modular decking plank and decking structure. Davis' decking is polymer-based, but it also requires that each plank be fastened securely to an underlying structure, which does not allow the decking to be truly modular, and it also does not accommodate normal expansion, contraction, and other movement.

Still others have addressed the issue of modular systems for boat docks. U.S. Pat. No. 4,050,257 to Parks et al. (1977) discloses a demountable dock assembly. However, this assembly is fairly complex, requires a unique frame structure, and is not easily usable in tidal coastal environments. U.S. Pat. No. 5,156,493 to Johnson (1992) discloses a dock kit that can be used to construct a modular dock system with removable decking sections. The dock kit of Johnson, however, is fairly complex and contains numerous metal parts. The dock kit would not be advantageous in a tidal coastal marine environment. U.S. Pat. No. 4,645,380 to Hambrick et al. (1987) discloses a docking system consisting of sections that are attached to the previous section by a pivot point, with each section including a set of legs that engage the soil at its far end. Again, a major drawback to the docking system of Hambrick is that it would not be easily usable in tidal coastal environments, especially in situations that require long dock lengths.

All of the boat dock system patents mentioned earlier have common flaws in that they all require unique structures (and are therefore not adaptable to an existing structure) and they all are specific only to boat docks (and cannot be used in residential and/or commercial applications).

Finally, U.S. Pat. No. 5,339,581 to Schlickenmeyer (1994) discloses a modular deck flooring system. Schlickenmeyer's modular deck flooring system addresses the issue of decking modularity. However, his system would be heavy and awkward to remove, especially when wet, since it is constructed of wooden planks and metal fasteners. Repeated removal and installation would cause the fastening locations to loosen, possibly to the point of uselessness. It would also be subject to the other drawbacks, described earlier, associated with wooden decking and metal fasteners.

SUMMARY OF THE INVENTION

The present invention is directed to a removable modular decking system having particular use in a marine dock or pier environment. The system allows the user to remove the decking prior to a large storm, preventing destruction of the dock structure by the hydraulic forces of violently rising water. Alternatively, the system may be used in a residential or commercial situation allowing the user to install decking over an area that typically requires access, such as over a flat roof or over areas containing buried services such as cables or piping.

The system comprises a plurality of decking sections that are releasibly attachable to a conventional joist system that includes first and second spaced, parallel support joists that have segments with clamp engaging lower surfaces. Each decking section includes a horizontal load-bearing member that has an upper surface, a lower surface, and first and second ends, and a longitudinal axis that is aligned with the support joists when the section is mounted on the joists.

The sections have a pair of spaced clamps that extend downwardly from the lower surface of the load-bearing member. Each clamp has an attachment end attached to the lower surface of each load-bearing member adjacent an end of said member, and an outwardly extending locking arm that projects beneath the clamp engaging surface of a support joist when the load-bearing member is mounted in position.

The support joists may include inwardly directed lips or flanges with lower surfaces that form the clamp engaging lower surfaces. For example, a joist may be formed of a vertical member having an upper edge, and a horizontal joist cap that is nailed or otherwise attached to the upper edge of the vertical member with the inner edge of the cap projecting inwardly to form a flange.

Other joist constructions are also contemplated by the invention, so long as a clamp engaging surface is provided to prevent upward movement of the clamp arms when the decking section is in its mounted position. For example, the joist can be formed, e.g., by routing, with a longitudinal, horizontal groove on the inside of the vertical joist, with the upper wall of the groove forming the undersurface engaged by the clamp arm. Instead of a horizontal joist cap attached to the upper surface of the vertical joist, a furring strip can be attached to the upper edge of the joist inner side wall. A bracket can also be attached to the joist, or a joist with an inwardly-extending lip or flange can be formed as an integral unit from metal or a plastic.

The inner edges of the flanges are spaced at a first given distance. The outer ends of the clamp locking arms are spaced from each other at a distance greater than this first given distance, so that the ends of the locking arms extend beneath the flanges when the load-bearing member is supported on the support joists with its longitudinal axis aligned with the joists. Consequently, the locking arms will engage the lower surfaces of the flanges if the load-bearing surface is urged upwardly, preventing the section from separating from the joists.

As used herein, a locking arm "engages" the lower surface of the flange when the lower surface is positioned above the locking arm, thereby preventing the locking arm, and thereby the decking section, from being lifted from the joists. Preferably, the dimensions of the clamp and flange are such that the upper surface of the locking arm fits snugly against the lower surface of the flange when the decking section is mounted on the joists.

The overall decking system is comprised of a plurality of abutting decking sections, with an end of the load-bearing members of each section abutting an end of another section. In order to maintain the sections in alignment with each other, one end of each section includes alignment pins, and the other end of the section includes alignment pin receiving recesses. Therefore, when two sections are aligned, the alignment pins of one section extends into the alignment pin recesses of the adjacent section.

The decking system may also include an end member that extends perpendicularly across the support joists, with the end member being secured by nails, screws, or in another suitable manner. This end member may include alignment pins or recesses to secure the end member to an adjacent decking section. Each decking system may also include resilient cushioning members between the support joists and the load-bearing members.

The load-bearing members may be of one-piece construction, but is preferably comprised of a plurality of adjacent plank sections secured to each other. For example, the planks may be attached to one or more rails that extend beneath the planks. Alternatively, the planks may be pivotally joined to each other, or joined by flexible members, so that the load-bearing member can be rolled for storage.

The clamps used in the present invention may be of different constructions. Each clamp has an attachment end that is secured to the lower surface of the load-bearing member, an outwardly extending locking arm to project beneath the clamp-engaging lower surface of the joist flange when the load-bearing member is mounted in position, and an elongated central section connecting the attachment end and the locking arm. In a preferred embodiment, the attachment end of the clamp is fixedly attached to the lower surface of the load-bearing member adjacent one corner, the clamp then extends beyond the end of the load-bearing member, with the locking arm extending outwardly from the outer end of the connecting section.

The locking arms extend from opposite sides of the two clamps. However, construction of two separate clamp molds can be avoided by using a clamp that has locking arms projecting from both sides. A clamp of this design can be used on both sides of the decking section, with the inner locking arm of each clamp being unused. In order to secure the decking section firmly against the joist upper surfaces, the spacing between the lower surface of the decking section and the upper surface of the locking arm, when the decking section is mounted horizontally on the joists, should be approximately equal to the thickness of the flange or lip.

Instead of being fixedly attached to the load-bearing member, the attachment ends of the clamps may be pivotally or rotatably attached. These embodiments, while of a slightly more complex construction, provide the advantage that the decking section can be mounted in position before the locking arms of the clamps are positioned beneath the clamp engaging lower surfaces. In each of these designs, the clamp has a withdrawn position in which the locking arms do not project outwardly beyond the inner edges of the flanges, and an extended position in which the locking arm ends are separated by a distance greater than the spacing of the flange inner edges, so that the ends of the locking arms will project beneath the clamp engaging lower surfaces.

In the alternative clamp construction in which the clamp is rotatably mounted, the load-bearing member includes clamp attachment bores adjacent the outer sides near one end. Each clamp includes an attachment arm that extends through one of the bores and is rotatable therein so that the locking arm is moved in a horizontal plane. Locking caps secure the attachment arms in the bores.

The clamp can also be pivotally mounted on a horizontal axis, so that the locking arm moves in a vertical plane between the two positions. Also, the clamp can be mounted to project outwardly from a vertical axis so that the clamp rotates as a horizontal plane between retracted and extended positions. In either of these embodiments, the clamp may include a locking mechanism to secure the clamp arm in the extended position. For example, the clamp can include a flexible member that engages a stop adjacent the clamp, or a spline segment that extends from the clamp into the load-bearing member. Other locking members will be apparent to one skilled in the art.

Each load-bearing section preferably includes a plurality of planks that are joined in parallel to rails that hold the planks together during the transportation, installation and removal of the decking sections. A joist cap is provided over each supporting joist, and clamping mechanisms are provided to secure the decking sections to the joists. The addition of the joist caps allows the use of an existing joist system. Alternatively, the joists, existing or new, may be modified to provide a lip, groove, or bracket to which a clamp may be locked.

In a preferred embodiment of the invention, the clamping mechanism comprises a pair of clamps on the under side of one side of each decking section, and each clamp is fixedly attached to a plank of the decking section. Each clamp incorporates a locking segment that engages the under-side of a joist cap to secure the decking section to the joist system. The use of a "floating" clamping system provides a secure engagement between the decking and joist system, while not introducing warping, buckling, and loosening of the decking due to movement from thermal expansion, thermal contraction, or other externally-induced motion.

In a preferred embodiment of the invention, the planks of the decking sections are made of polymer-based materials which will not warp, splinter, rot, mildew, discolor, or crack due to normal exposure to the elements. This also eliminates the rusting and loosening typically experienced with metal fasteners in a wood-based decking system. Further, polymer-based materials can be manufactured as essentially non-porous, making them stain-resistant and easily cleaned without the use of harsh chemicals. Other advantages of the system are that it is relatively inexpensive to manufacture with existing polymer extrusion and molding technologies, including mechanisms for anti-skid features, and it is extremely simple to install. Customization of the system can be done at a manufacturing site or at the installation site, with little more than simple tools.

Accordingly, the removable modular decking system of this invention provides a means with which an individual can easily install, remove, and reinstall decking repeatedly without harm to the system itself.

Further objects and advantages are to provide a decking system that is aesthetically pleasing, durable, strong, flexible, easy and inexpensive to manufacture, and easy to install. Still further objects and advantages will become apparent from a consideration of the ensuing description and drawings.

BRIEF DESCRIPTION OF THE DRAWINGS

FIG. 1 is a perspective view of a decking section supported on a pair of parallel joists.

FIG. 2 is an end view of a decking section and a pair of parallel joists.

FIG. 7 is a perspective view of the alternative clamp illustrated in FIG. 6.

FIG. 8 is a perspective view of an alternative load bearing member constructed to a plurality of sections held together by flexible attachment members, and side retaining members.

DETAILED DESCRIPTION OF THE INVENTION

Figure 3:
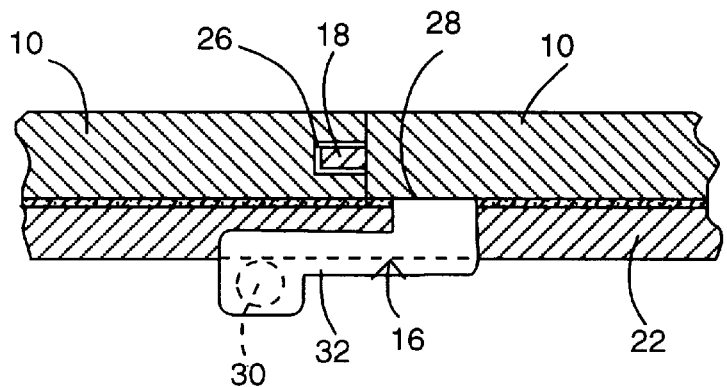
FIG. 3 is a sectional side view of two abutting decking sections supported on a joist, showing the relationship of a clamp to the decking section and joist flange.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale. Like elements are designated by like numbers.

Referring now to the drawings, FIG. 1 shows a perspective view of a preferred embodiment of the invention. A load-bearing member, generally 10, comprised of a plurality of planks 12, is connected to rails 14, forming, along with clamps 16, a modular decking section. Rails 14 can be attached to the planks 12 using adhesive, chemical glue, clips, fasteners, or any combination of those methods. Rails 14 do not necessarily need to be sufficient in size or strength to support load, but they must be substantial enough to hold planks 12 together during the transportation, installation, and removal processes. Rails 14 may assume different forms and/or be constructed of different materials, depending on the actual extrusion profile chosen for planks 12.

In the illustrated embodiment, a pair of rails 14 is used to secure planks 12 of load-bearing member 10. Each decking section contains two or more fixed clamping mechanisms or clamps 16. Clamps 16 may assume different forms and/or be constructed of different materials, depending on the actual extrusion profile chosen for planks 12. Each section may also contain a number of security or alignment pins 18.

A conventional joist 20 will receive a joist cap 22 and, in some embodiments, a cushion 24. When needed, cushion 24 will increase the clamping force and/or decrease squeaking between the load-bearing member 10 and joist caps 22. Joists 20 are typically standard 2×8 or 2×10 wood planks. The decking sections are installed onto and supported by joist caps 22 on joists 20. Clamps 16 engage the underside of joist caps 22 at each end of the decking section. Each decking section may be secured against an adjacent decking section using a combination of alignment pins 18 on the end of one decking section and corresponding alignment holes 26 (shown in FIG. 3) in the mating end of the adjacent section.

The "floating" clamping system described here minimizes the possibility of warping or bucking due to thermal expansion and contraction, while still providing a secure engagement of the decking to the joist system. It also allows movement (such as that typically found in marine pier environments) without loosening any hardware. When necessary, individual planks 12 or partial decking sections may be attached to the joist system through more standard methods (nails, screws, washers, etc.).

FIGS. 1, 2 and 3 provide details of the preferred embodiment of the invention. FIG. 2 shows an end view of joists 20 and a decking section 10. The manufacturing process and material for plank 12 is selected for strength, UV resistance, abrasion resistance, it's ability to be colored, and it's ability to withstand temperature cycling and salt-air environments. Examples of materials that may be used are vinyl/polyvinyl-chloride (PVC), nylon, glass-filled nylon, composite, co-extruded polymers, resin, etc. As shown in FIG. 7. The top of plank 12 may be textured to simulate a wood grain appearance (or otherwise as design trends dictate) and provide small channels for water movement, adding to the anti-skid performance of the system.

The dimensions and extrusion details of plank 12 are variable and dependent on aesthetic design trends and structural requirements, but they typically mirror the dimensions of standard wood members used in similar applications. Many different extrusion profiles are possible and currently available in the marketplace, with each having distinct advantages. The color of the polymer extrusion is also dependent on aesthetic design trends.

FIG. 3 shows a side view, as viewed from the inside of the decking section, of clamp 16 for the preferred embodiment. Each clamp incorporates a mounting section or attachment end 28, which provides a means of attaching clamp 16 in a fixed manner to a plank 12. Each clamp 16 also incorporates a locking segment or arm 30, which engages the under-side of joist cap 22 to secure the modular decking section to joists 20.

The material for clamp 16 is selected for strength, UV resistance, abrasion resistance, it's ability to be colored, and it's ability to withstand temperature cycling and salt-air environments. Examples of such materials are vinyl/polyvinyl-chloride (PVC), nylon, glass-filled nylon, composite, resin, etc. The actual dimensions and design of clamps 16 are dependent on those chosen for the joist cap 22 and plank 12. They are chosen to facilitate engagement with the joist cap 22 while the decking section is in a vertical position and then the subsequent transition of the decking section to the horizontal position.

The use of a cylindrical locking segment or arm 30 facilitates the use of locking arm 30 as a pivot point for this operation; it also provides secure engagement and strength while not imparting significant frictional forces that would serve to make final positioning difficult. Left- and right-hand versions of the clamps 16 are required to fully secure each decking section. Alternatively, each clamp 16 could be molded with locking arms 30 on both sides the connecting section 32 of every clamp 16.

Figure 4:
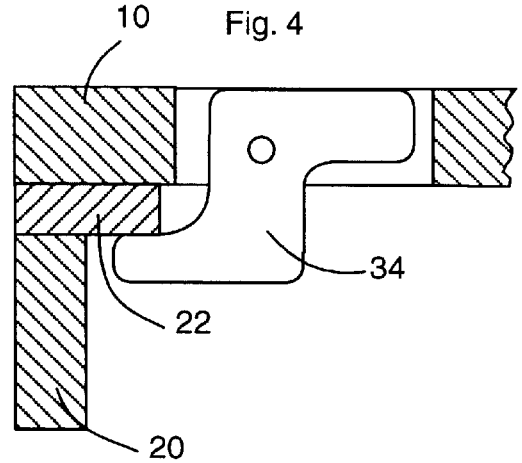
FIG. 4 is a sectional side view of an alternative clamp adapted to pivot in a vertical plane between a withdrawn position and the extended position shown.
Figure 5:
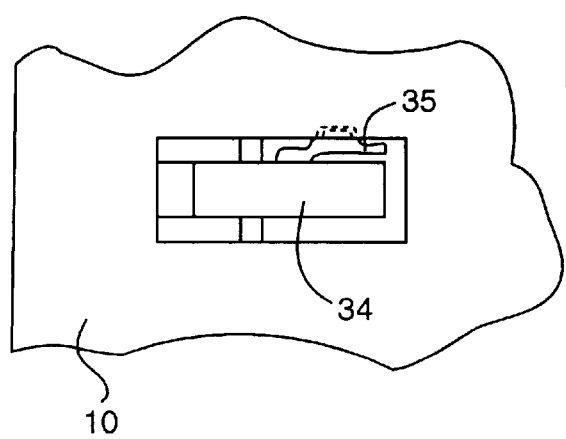
FIG. 5 is a top view of the alternative clamp shown in FIG. 4, illustrating a locking mechanism to hold the clamp in the extended position.
Figure 6:
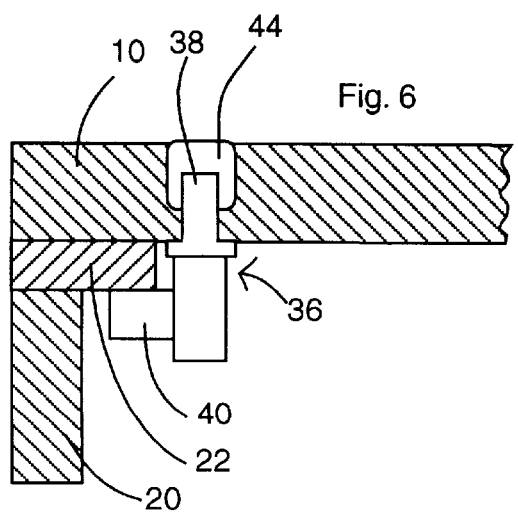
FIG. 6 is a sectional side view of an alternative clamp adapted to rotate in a horizontal plane between a withdrawn position and the extended position shown.

In the alternative clamp illustrated in FIGS. 4 and 5, clamp 34 is adapted to pivot in a vertical plane between a withdrawn position, and the extended position shown. Lock 35 holds clamp 34 in the extended position, until pushed toward clamp 34 to release lock 35 from the recess in load-bearing member 10. Clamp 36, shown in FIGS. 6 and 7, is comprised of a rotatable attachment arm 38 at its inner end and a locking arm 40. Arm 38 extends upwardly through bore 42 and is held in place by cap 44. Clamp 36 is adapted to rotate about the longitudinal axis of arm 38 between a withdrawn position, and the extended position shown. These alternative clamps permit installation of the decking section in the desired position, followed by pivoting or rotating of the clamps to lock the decking section to the joists.

The manner of using the removable, modular decking system (as a final, installed product) is very similar to a standard wood-based decking system. Namely, one simply walks on the decking. However, the removable, modular decking system distinguishes itself in the installation and removal processes.

To begin installation of the preferred embodiment, joist caps 22 are attached to joists 20 through established means (screws, bolts, etc.) such that at least one edge of the cap is made to extend past the side of the joist, creating a lip or flange. A decking section comprised of a load-bearing member 10 with clamps 16 pre-installed is tilted up approximately 90° onto the edge adjacent to the pair of clamps 16. The decking section is then turned slightly such that clamps 16 can drop below the lips or flanges created by joist caps 22. The decking section is rested onto the joist caps 22 (and cushions 24, if present). The decking section is then rotated (still on its front edge) until it is aligned perpendicular to joists 20. The decking section is then tilted to the horizontal position so that all planks 12 rest on the upper surfaces of joist caps 22, or the intermediate cushioning material 24.

To complete the installation, the decking section is pulled backward so that alignment pins 18 protruding from an end of the decking section are inserted into corresponding pre-drilled pin receiving holes 26 in the end of the abutting, previously installed decking section. The combination of alignment pins 18 and clamps 16 secure the ends of both decking sections firmly to the joist system. When full decking sections cannot be installed in a location, partial decking sections can be used or individual planks 12 can be fastened to the joist system with standard hardware (preferably stainless steel screws). Removal of the decking system occurs in the reverse of the sequence described above, and reinstallation occurs exactly as the initial installation.

FIG. 8 shows a perspective view of an alternative embodiment of a load-bearing member constructed of a plurality of adjacent, parallel planks 12 connected by flexible cords 46 (polymer or natural rope, plastic ribbon, plastic-coated metal cable, etc.). Removable edge rails 48 hold planks 12 together, and can be detached, permitting load-bearing member to be rolled up. This ribbon-based design is beneficial in very long, straight decking applications.

Although the description above contains many specific examples, these should not be construed as limiting the scope of the invention. The examples serve to provide illustrations of some of the presently preferred embodiments of this invention. For example, the extruded plank could be made from different materials or methods, such as recycled material, co-extruded materials, structural-foam-filled extrusion, etc.; the details of the plank extrusion profile may vary with aesthetic and/or structural requirements; the anti-skid mechanism can have other forms, such as integral texturing, co-extruded materials, etc.; the clamping mechanism could take many forms, depending on the plank extrusion details, or be constructed of different materials; the removable, modular decking system could be constructed wholly of typical building materials (wood, nails, screws, metal brackets, etc.) if the market demands such a product. The joist and joist cap can be formed, e.g., by extrusion, as one-piece. Finally, combinations of the various embodiment features would be useful in specific applications.

What is claimed is:

1. A decking system comprised of:
   a) first and second spaced, parallel support joists having clamp engaging lower surfaces;
   b) a plurality of horizontal load-bearing members, each load-bearing member having an upper surface, a lower surface, and first and second ends; and
   c) first and second clamps attached to the lower surface of each load-bearing member adjacent an end of said member, said clamps being moveable between a withdrawn position and an extended position, said clamps including outwardly extending locking arms insertable beneath the clamp engaging surfaces of said support joist when said load-bearing member is supported on said support joists, and said clamps are in said extended position.

2. The decking system of claim 1, wherein said joists include inwardly directed flanges with lower surfaces forming said clamp engaging lower surfaces.

3. The decking system of claim 2, wherein said flanges include inner edges spaced at a first given distance, and said clamps include outwardly extending locking arms with outer ends, the outer ends of said arms being spaced from each other at a distance greater than said first given distance, whereby said locking arms extend beneath said flanges when said load-bearing member is supported horizontally on said support joists.

4. The decking system of claim 1 including first and second load-bearing members, the first end of said first member abutting the second end of said second member, said first member's first end including outwardly extending alignment pins and said second member's second end including alignment pin receiving recesses.

5. The decking system of claim 1, wherein each of said load-bearing member is comprised of a plurality of adjacent, attached plank sections.

6. The decking system of claim 1, wherein said clamps extend beyond an end of said load-bearing member.

7. The decking system of claim 1, wherein said load-bearing member has a textured upper surface.

8. The decking system of claim 1, further including resilient cushioning members between said support joists and said load-bearing member.

9. A decking system comprised of:
   a) first and second spaced, parallel support joists having in inwardly directed flanges with lower surfaces and parallel inner edges, said parallel edges being separated by a first given distance;

b) a plurality of horizontal load-bearing members, each load-bearing member having an upper surface, a lower surface, and first and second ends; and c) first and second clamps attached to the lower surface of each load-bearing member adjacent an end of said member, said clamps including outwardly extending locking arms with outer ends, the outer ends of said arms being spaced from each other at a distance greater than said first given distance, whereby said locking arms extend beneath said flanges when said load-bearing member is supported on said support joists, said load-bearing member including clamp attachment bores for each of said clamps, and each of said clamps including an attachment arm extending through one of said bores, said system further including locking caps securing said attachment arms in said bores.

10. The decking system of claim 9, wherein said flanges have a given thickness, and the distance between the lower surface of said load-bearing member and said locking arm is approximately equal to said given thickness.

11. The decking system of claim 9, further including an end member secured across said support joists.

12. A decking system comprised of:

a) first and second spaced, parallel support joists having clamp engaging lower surfaces spaced at a given distance;

b) a horizontal load-bearing member having an upper surface, a lower surface, opposed sides, a longitudinal axis, and first and second ends; and c) first and second clamps attached to the lower surface of said load-bearing member adjacent an end of said member, said clamps including outwardly extending locking arms with outer ends, the outer ends of said arms being spaced from each other at a distance greater than said given distance, whereby said outer ends extend beneath the clamp engaging lower surfaces of said support joists when said load-bearing member is supported on said support joists and the longitudinal axis of said load-bearing member parallel to said joists.

13. The deck system of claim 12, wherein said load-bearing member includes alignment pins projecting from said first end and alignment pin receiving recesses in said second end.

14. The deck system of claim 12, wherein each of said load-bearing member is comprised of a plurality of adjacent, attached plank sections.

15. The deck system of claim 12, wherein said clamps extend to beyond an end of said load-bearing member.

16. The deck system of claim 12, wherein said load-bearing member has a textured upper surface.

17. The decking section of claim 12, wherein said load-bearing member is formed of a polymeric material.

* * * * *